United States Patent [19]
McClelland

[11] Patent Number: 5,828,153
[45] Date of Patent: *Oct. 27, 1998

[54] ROTOR FOR A RELUCTANCE MACHINE

[75] Inventor: Michael Leo McClelland, Harrogate, England

[73] Assignee: Switched Reluctance Drives Limited, North Yorkshire, England

[*] Notice: This patent issued on a continued prosecution application filed under 37 CFR 1.53(d), and is subject to the twenty year patent term provisions of 35 U.S.C. 154(a)(2).

[21] Appl. No.: 762,562

[22] Filed: Dec. 9, 1996

[30] Foreign Application Priority Data

Dec. 7, 1995 [GB] United Kingdom ................ 9525408.2

[51] Int. Cl.$^6$ .................................................. H02K 17/42
[52] U.S. Cl. .......................... 310/168; 310/254; 310/261; 310/258
[58] Field of Search ................................. 310/168, 254, 310/261, 258; 29/596, 598

[56] References Cited

U.S. PATENT DOCUMENTS

| | | | |
|---|---|---|---|
| 3,549,923 | 12/1970 | Kurakin et al. | 316/160 |
| 3,775,626 | 11/1973 | Burgbacher | 310/67 |
| 3,995,203 | 11/1976 | Torok | 318/166 |
| 4,110,646 | 8/1978 | Rao | 310/163 |
| 4,286,188 | 8/1981 | Honsinger et al. | 310/162 |
| 5,223,756 | 6/1993 | Bello | 310/90 |
| 5,266,859 | 11/1993 | Stanley | 310/216 |
| 5,509,492 | 4/1996 | Pfannschmidt | 180/65.5 |

FOREIGN PATENT DOCUMENTS

| | | | |
|---|---|---|---|
| 0 573 198 A1 | 12/1993 | European Pat. Off. | 310/168 |
| 0 621 677 A2 | 10/1994 | European Pat. Off. | 310/168 |
| 1341875 A | 9/1963 | France | 310/168 |
| 2406333 A | 5/1979 | France | 310/168 |
| 589436 C | 12/1933 | Germany | 310/168 |

OTHER PUBLICATIONS

Chan, C., "Single–Phase Switched Reluctance Motors," IEE Proceedings, vol. 134, No. 1, Jan. 1987, pp. 53–56.

*Primary Examiner*—Nestor Ramirez
*Assistant Examiner*—Elvin G. Enad
*Attorney, Agent, or Firm*—Patterson & Keough, P.A.

[57] ABSTRACT

A rotor for a switched reluctance or synchronous reluctance machine includes a central member from each end of which extends a rotor pole. The rotor is made up of continuous laminations which each define a plane parallel to the axis of rotation of the rotor. A reluctance machine is also disclosed in which the rotor is used. The rotor has radially inner pole faces which cooperate with the pole faces of an inner stator.

23 Claims, 6 Drawing Sheets

ROTOR FOR A RELUCTANCE MACHINE

BACKGROUND OF THE INVENTION

1. Field of the Invention

This invention relates to a rotor for a reluctance machine.

2. Description of Related Art

Reluctance machines are becoming increasingly widely used because of their relative simplicity and the improving switching and control electronics that are now available.

One form of reluctance machine is the switched reluctance machine which can be run as either a motor or a generator. The switched reluctance machine comprises a stator, defining stator poles, a phase winding for the or each phase and a rotor, defining rotor poles which move past the stator poles. Switched reluctance machines are described in more detail in the paper "The Characteristics, Design and Applications of Switched Reluctance Motors and Drives" by Dr. J. M. Stephenson and Dr. R J Blake presented at PCIM '93 at Nurnberg, Germany, Jun. 21–24, 1993, which paper is incorporated herein by reference.

Another type of reluctance machine is a synchronous reluctance machine which has a rotor similar to that of the switched reluctance machine. The stator, however, is similar to that of a conventional, slotted stator, alternating current machine, and the windings are wound according to the well known principles of such machines. Such stators and their windings are described in many textbooks, e.g. "Electric Machines" by Slemon and Straughen, Addison-Wesley Publishing Company, 1980, which is incorporated herein by reference.

The rotor is substantially common to both types of machine. Typically, it comprises a stack of laminations of a suitable magnetizable material, such as Newcor 800-65 manufactured by Orb Electrical Steels of Great Britain. The laminations each define the profile of a rotor core and a series of angularly arranged rotor poles. The laminations in this form of reluctance machine are called radial laminations as they lie in planes which are perpendicular to the axis of rotation of the rotor. They are robust structures because the radial forces imposed on the rotating rotor are resisted by the continuous extent of each lamination.

An alternative rotor arrangement has axial laminations that extend parallel to the axis of rotation of the rotor. In both switched and synchronous reluctance machines the axially laminated rotor is generally considered to give superior performance because the direction of lamination is such as to reduce the minimum inductance of the machine. This improves the efficiency of energy conversion. They are only rarely used, however, because they are considerably less robust than a radially laminated structure. There is no continuity in the direction of the radial forces referred to above. The axially laminated rotor has to rely on the strength of the bonding holding the laminations together or some other means of mechanical retention, eg. as shown in EP-A-621677, which is incorporated herein by reference. Thus, to manufacture a reliable axially laminated rotor requires a considerably more elaborate procedure than for the radially laminated rotor.

It will be appreciated that a conventional reluctance machine comprises a rotor which is intended to rotate within an embracing stator. The rotor poles extend radially outwardly and the stator poles radially inwardly. However, it is also known to arrange the machine such that an outer rotor has radially inwardly extending poles and the inner stator has radially outwardly extending poles.

SUMMARY OF THE INVENTION

It is an object of the present invention to provide a rotor for a reluctance machine that is robust and also simple to manufacture.

According to embodiments of the invention there is provided a rotor for a reluctance machine comprising a stack of laminations, forming at least one pair of spaced rotor poles, and a central member defining a flux path between the poles, the rotor further comprising journal means, the rotor poles extending from one side of the central member parallel to the axis of the journal means.

The flux path of the embodiments of the invention is, thus, in two planes because the central member is offset from the rotor poles.

Preferably the stack of rotor laminations defines arcuate pole faces on the rotor poles which are coaxial with the axis of the shaft. These pole faces may be on either the inner or outer surfaces of the rotor poles, depending on whether the machine has an external or an internal rotor, respectively.

Preferably, the laminations define planes which extend parallel to the axis of the shaft such that the profile of the central member and the rotor poles is defined in each continuous lamination.

It is possible to define a four or a six pole rotor from a single stack of laminations by folding the laminations to define pole arms angularly interjacent the pole arms defined in the plane of the flat lamination.

Also according to embodiments of the present invention there is provided a reluctance machine comprising a stator having at least one phase winding, and a rotor arranged to be rotatable relative to the stator about an axis, which rotor comprises at least a pair of rotor poles, each having a pole face, and a central member defining a flux path between the poles, wherein the central member is axially offset with respect to the poles.

Preferably, either the radially outer or inner surface of each pole is arcuate to define a uniform air gap between the surface and an adjacent stator pole, depending on whether the rotor is an internal or external rotor.

The construction and phase winding of the stator may be arranged such that the reluctance machine is a synchronous reluctance machine or a switched reluctance machine.

BRIEF DESCRIPTION OF THE DRAWINGS

The present invention can be put into practice in various ways some of which will now be described by way of example with reference to the accompanying drawings in which.

DETAILED DESCRIPTION OF PREFERRED EMBODIMENTS

Figure 1:
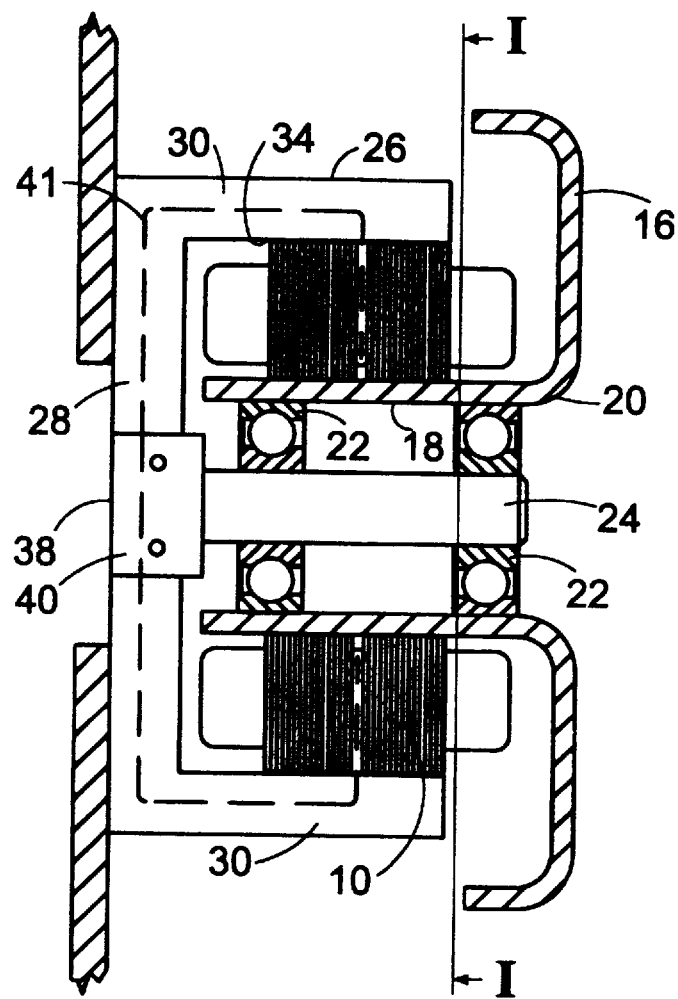
FIG. 1 is a cross-sectional view of a switched reluctance machine according to an embodiment of the invention.
Figure 2:
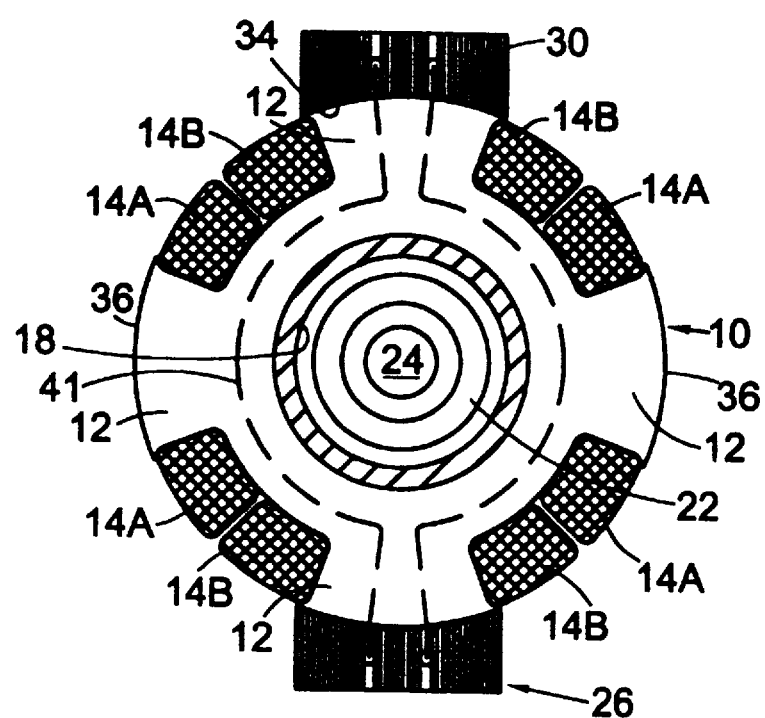
FIG. 2 is a section taken along the line I—I of FIG. 1.

FIGS. 1 and 2 show a switched reluctance machine comprising an inner radially laminated stator 10 having four equiangularly spaced, and radially outwardly extending stator poles 12. The gaps between the stator poles hold windings 14A, 14B arranged in two separately energizable phases A and B.

The stator is fixed on a mounting member 16 which comprises a central hollow column 18 and a radially outwardly extending apron 20 formed at one end of the column 18. A pair of spaced ball races 22 are secured in the column 18. A journal shaft 24 of an external rotor 26 is journalled in the ball races 22. The journal arrangement by which the rotor is able to rotate relative to the shaft can take other forms. The rotor may have a female journal member which is arranged to accept a journal member of the stator.

The rotor 26 comprises a stack of continuous U-shaped axial laminations which are arranged in planes parallel to the axis of the shaft 24. The laminations define a central member 28, which extends radially outwardly on opposite sides of the shaft 24, and a rotor pole arm 30 depending from each end of the member 28. The pole arms 30 extend parallel to the shaft 24, spanning the stator, and end in the same plane as that defined by the end of the stator poles distal from the central member 28 of the rotor 26.

It will be seen from FIG. 2 that the pole face 34 of each rotor pole arm 30 and the directly opposite stator pole faces 36 are arcuate. The radius of curvature of the arcuate rotor and stator pole faces are centered on the axis of the shaft 24 and, thereby, create a uniform air gap between them.

The stack of laminations in this embodiment is held together, and the shaft 24 is secured to the stack of laminations, by a clamp 38 that is riveted to the rotor 26 through its spaced clamping jaws 40.

The manner of controlling the switched reluctance machine of this invention is conventional to the art of controlling known two phase, two rotor pole, four stator pole switched reluctance machines run as generators or motors. No further description is required here in this regard as the control techniques will be well known to the skilled person. The alternately timed energization of the phase windings 14A and 14B alternately, creates flux which flows from one stator pole, across the air gap and around the rotor to the opposite stator pole. In this embodiment the flux travels in a three-dimensional flux path along the continuous laminations of the rotor, firstly in a direction parallel to the axis of the shaft and then radially along the central member into the other rotor pole and thence to the stator. The continuous laminations present a low reluctance path for the flux in the rotor which is beneficial to the efficiency of the machine.

Figure 5A:
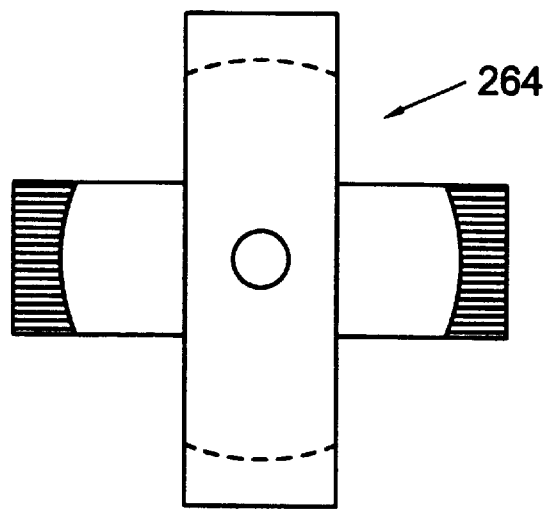
FIGS. 5(a)–5(b) show an arrangement for providing 4-pole and 6-pole rotors according to an embodiment of the invention.
Figure 5B:
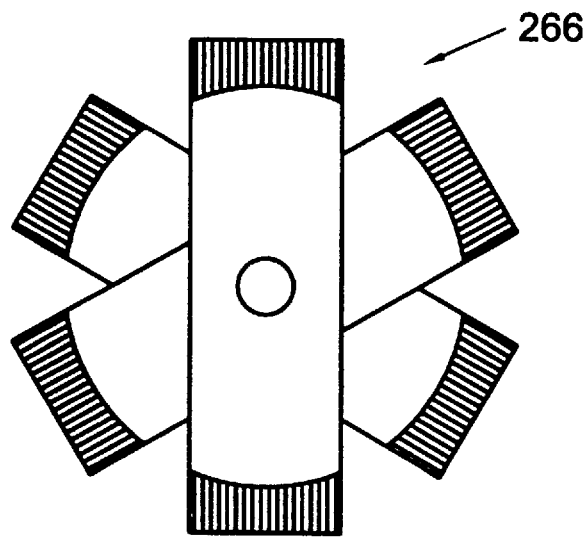

Other numbers of rotor poles can be implemented according to embodiments the invention. FIGS. 5(a) and 5(b) show four and six pole rotors 264, 266 respectively. Essentially, two or more two-pole rotor stacks are fixedly mounted on a common shaft or otherwise secured together. For the special case of the four pole rotor, a pair of two-pole stacks are arranged at opposite ends of a stator on the same shaft. The pole arms of one stack project toward the other stack so that all the rotor poles are within the enclosed space defined by the stator.

The laminations of the rotor could all be made of a suitable magnetizable steel, such as Newcor 800-65. However, the stack of laminations could be made from alternate layers of magnetizable and non-magnetizable material to provide barriers to flux migration between the laminations, further enhancing the efficiency of the rotor.

A reluctance machine incorporating a rotor according to embodiments of the invention provides a high specific output and a reduced electronic control cost compared with conventional radially laminated rotor designs. This is due to the marked reduction in minimum inductance which can be achieved with the construction as described by embodiments of the invention. As described in the paper by Stephenson and Blake referenced above, the minimum inductance of a reluctance machine is determined largely by the separation between the rotor poles and the distance from the stator pole face to the core or central member of the rotor. In embodiments of the invention, the spacing between the rotor poles is very large and the distance between the stator pole face and the central member is also very large.

This leads to a low minimum inductance and hence to a high difference between the maximum and minimum inductance. This increased difference gives a direct increase in torque output for the same current supplied to the machine.

While the externally arranged rotor of embodiments of the invention allows a particularly compact machine structure, one limiting factor on size could be the need for a transducer to supply information on rotor position to the control electronics. However, this can be addressed by dispensing with a more conventional rotor position transducer and using a sensorless rotor position monitoring technique. For example, EP-A-0573198, which is incorporated herein by reference discloses such a technique that could be used in the machine of FIGS. 1 and 2.

Figure 3:
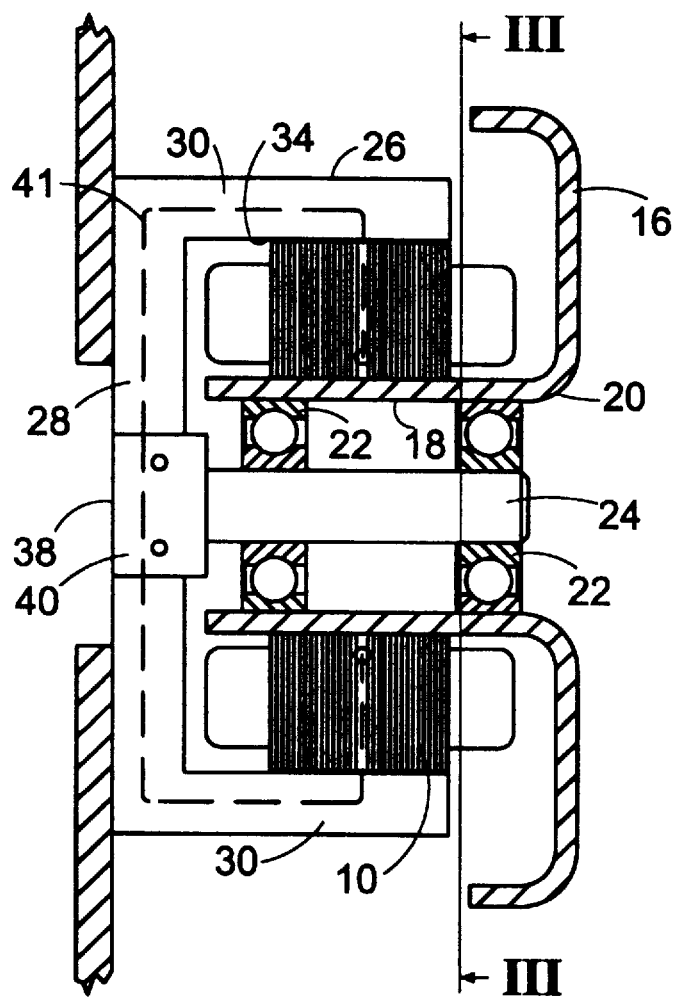
FIG. 3 is a cross-sectional view of a synchronous reluctance machine according to an embodiment of the invention.
Figure 4:
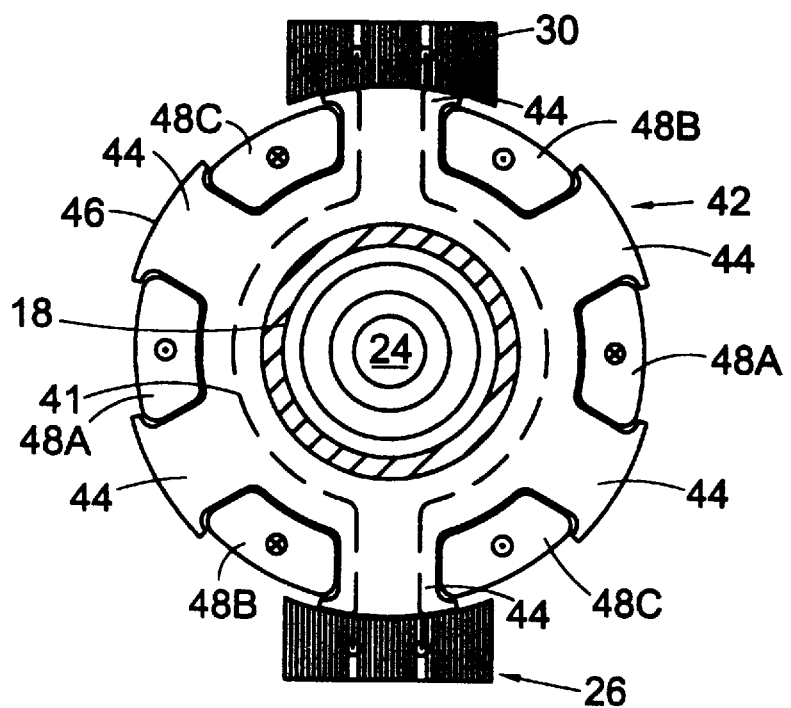
FIG. 4 is a section taken along the line III—III of FIG. 3.

FIGS. 3 and 4 illustrate a synchronous reluctance machine which is similar in many respects to the machine of FIGS. 1 and 2. Thus, where appropriate, like numerals have been used to indicate like parts.

The synchronous reluctance machine of FIGS. 3 and 4 differs particularly in the form of the stator. In this embodiment, a stator 42 comprises six stator poles 44, each defining a radially outwardly facing arcuate pole face 46. Three pairs of windings 48A, 48B and 48C, constituting three phase windings, are each wound in radially opposing gaps between the stator poles 44. Again, this is essentially the conventional three-phase synchronous reluctance machine winding arrangement with which the skilled person will be familiar. It will be apparent that the stator can have 2np stator poles, where p is the number of phases and n is greater than or equal to 1, in accordance with conventional synchronous reluctance motor theory.

Because of the axial laminations, once the rotor has been assembled and clamped together, the pole faces can be accurately machined. In addition, the journal shaft of the rotor can be machined accurately as part of the same procedure for turning the pole faces to ensure good concentricity.

A particular form of the invention may be used where it is preferable to use standard parts without further machining operations. To this end, standard "C-core" laminations, as produced for use in transformers and inductive chokes, can be stacked side by side and mounted in the clamp 40. This gives a rotor pole face which is flat and tangential to the stator pole face. The airgap therefore varies across the face of the rotor pole, being in a minimum in the center. Although this somewhat reduces the maximum inductance (because the average gap is higher) it gives a very economical construction.

In a particular form of the invention suitable for low speed, low power application, the rotor can be completely solid, being machined or formed from a solid piece of magnetizable material. While this embodiment can be very economical to produce, its performance is not as good as the laminated version.

Figure 6:
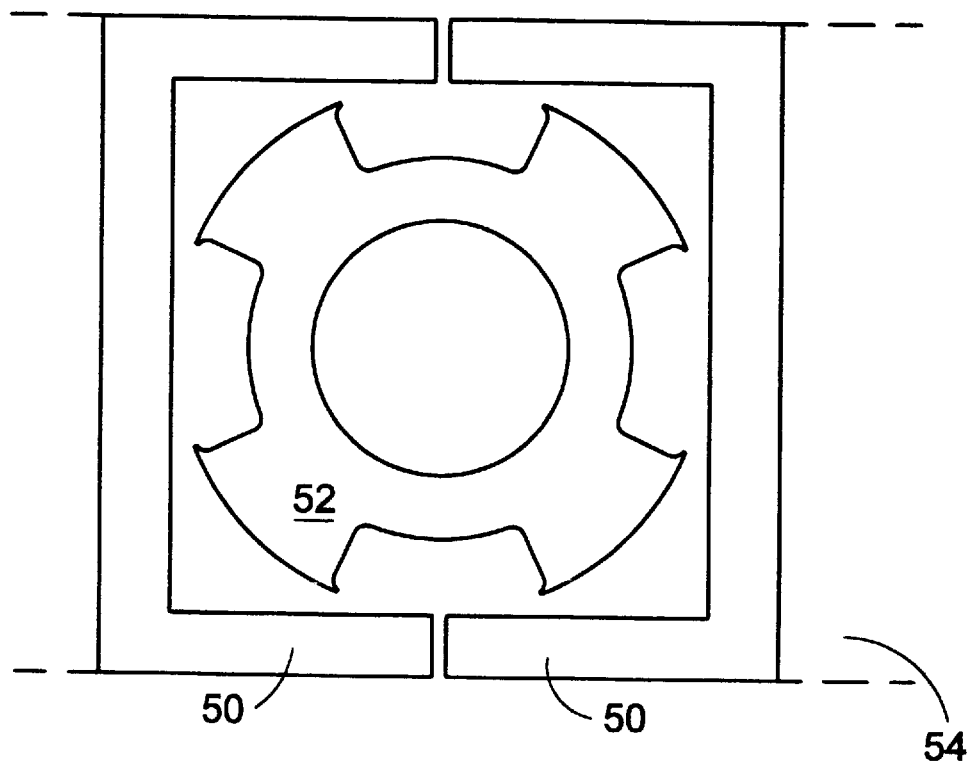
FIG. 6 shows a layout for the position in a lamination strip of stator and rotor laminations.

FIG. 6 shows a layout of laminations to indicate the method by which these could be made on a lamination press tool. The U-shaped rotor laminations 50 are arranged around the lamination for the stator 52. It will be noted that the layout is particularly compact and has a very low proportion of wastage. This contributes to economic manufacture of the laminations. The laminations are cut from a strip 54 of the magnetizable steel which is indicated by the broken line. It will be seen that the outer edges of the pole arms are defined by the edges of the strip so that waste material at the outer edge of the strip is eliminated. Similarly, the outer edges of the central member between the pole arms of the rotor laminations can be defined without intervening waste material between them.

Embodiments of the invention provide a compact machine that has the advantage of using axial laminations for the rotor which are more efficient than radial laminations. The ability to use the axially laminated rotor is not at the expense of cost of manufacture. The reluctance machine using the rotor of this invention is relatively simple to construct. The rotor is also robust because of the continuity of the laminations in the axially laminated form.

It will be apparent that the reluctance machine using the rotor of this invention may be packaged in a variety of ways, depending on the requirements of the applications. For example, if the machine forms part of a drive system which is exposed to the user, a protective shroud or guard may be required. If the machine is to operate in a dirty environment, a shroud may be formed around the outside of the rotor. Such a shroud may have both protecting and strengthening functions. It can be made of any suitable material, e.g. steel, aluminium, plastic, etc. Further, the shroud could form part of another component, e.g. it could also be the hub of a fan, from which the fan blades extend.

It will be apparent to the skilled person that this form of rotor construction does not rely on adhesion between laminations for its strength. It therefore follows that a separator could be placed between the laminations to reduce the amount of flux flowing across the laminations. Such a separator could be made from any non-magnetic material, though it would be beneficial to use a material which is also non-conducting, e.g. an insulating material such as calendared paper.

Of course, the offset nature of the rotor poles of the rotor can be utilized in an internal rotor having radially outer pole faces and running inside an embracing stator. In either case, the offsetting may allow for direct connection of a driven member to the core of the rotor rather than to the shaft. Again, this may be of advantage in applications where axial space is limited.

While the invention is susceptible to various modifications and alternative forms, specific embodiments have been shown by way of example in the drawings and have been described in detail. It should be understood, however, that this is not intended to limit the invention to the particular forms disclosed. On the contrary, the intention is to cover all modifications, equivalents and alternatives falling within the scope of the invention as defined in the appended claims.

What is claimed is:

1. A rotor for a reluctance machine, the rotor comprising:
a journal defining an axis extending in an axial direction; and
at least one stack of magnetizable laminations, each stack of laminations extending in a plane parallel to the axis and defining:
at least a pair of spaced rotor poles; and
a central member extending between the rotor poles;
wherein:
the rotor poles extend from one side of the central member parallel to the axis of the journal; and
the rotor defines a flux path extending in an axial direction along one of the spaced rotor poles, then extending along the central member, and then extending in an axial direction along another of the spaced rotor poles.

2. A rotor as claimed in claim 1 in which the stack defines arcuate pole faces coaxial with the journal.

3. A rotor as claimed in claim 2, wherein:
the rotor poles define radially inner surfaces; and
the pole faces are on the radially inner surfaces of the rotor poles.

4. A rotor as claimed in claim 1 in which the laminations define a continuous flux path between the rotor poles.

5. A rotor as claimed in claim 1 further comprising a second stack of magnetizable laminations secured in fixed relationship with the one stack, the second stack having at least a pair of spaced rotor poles, the two stacks together defining four rotor poles.

6. A rotor as claimed in claim 5 in which the two stacks are mounted on a rotor shaft, the pair of rotor poles of the one stack projecting toward the pair of rotor poles of the other stack.

7. A reluctance machine, comprising:
a stator, the stator having at least one phase winding; and
a rotor arranged to be rotatable relative to the stator about an axis, the rotor being defined by a stack of magnetizable laminations extending in a plane parallel to the axis, the rotor comprising:
at least a pair of rotor poles, each rotor pole having a pole face; and
a central member extending between the rotor poles, the central member being axially offset with respect to the pole faces;
wherein the rotor defines a flux path extending in a direction substantially parallel to the axis and in a direction along the central member.

8. A machine as claimed in claim 7 in which the rotor is an external rotor which embraces the stator.

9. A machine as claimed in claim 8, wherein:
the rotor poles define radially inner surfaces of the rotor, the radially inner surfaces being arcuate;
the stator defines at least a pair of stator poles; and
a uniform air gap is defined between each radially inner surface and an adjacent one of the stator poles.

10. A machine as claimed in claim 8 in which the rotor is rotatably mounted in the stator.

11. A machine as claimed in claim 10, including a journal extending axially from the central member, the journal being mounted in a bearing arrangement in the stator.

12. A machine as claimed in claim 7, wherein the central member is secured to a journal of the rotor by a clamp.

13. A machine as claimed in claim 7 in which the plane of each lamination in the stack of laminations extends substantially parallel to the axis.

14. A machine as claimed in claim 13 in which each lamination defines a continuous flux path between the rotor poles.

15. A machine as claimed in claim 14 in which each lamination is substantially U-shaped.

16. A machine as claimed in claim 14 in which the laminations are of the same dimensions.

17. A machine as claimed in claim 7 in which the phase winding is arranged as a switched reluctance machine winding.

18. A machine as claimed in claim 7 in which the phase winding is arranged as a synchronous reluctance machine winding.

19. A reluctance machine as claimed in claim 7, wherein the flux path substantially parallel to the axis extends along the rotor poles.

20. A reluctance machine as claimed in claim 19, wherein the flux path along the central member extends between the rotor poles, in a direction substantially perpendicular to the direction of the flux path along the rotor poles.

21. A reluctance machine as claimed in claim 7, wherein the flux path extends from a stator pole of the stator, radially inwardly across an air gap between the stator pole and one of the rotor poles, along the one rotor pole parallel to the axis, along the central member between the rotor poles, along another of the rotor poles parallel to the axis, and then to another stator pole of the stator radially outwardly across an air gap between the other stator pole and the other rotor pole.

22. A reluctance machine as claimed in claim 7, wherein the rotor poles are spaced and define an interpole gap formed by empty space.

23. A reluctance machine, comprising:
a stator, the stator having at least one phase winding; and
rotor means for rotating relative to the stator about an axis, the rotor means comprising:
  a journal defining an axis; and
  at least one stack of magnetizable laminations extending in a plane parallel to the axis, each stack of laminations defining:
    at least a pair of spaced rotor poles, each rotor pole having a pole face; and
    a central member defining a flux path between the rotor poles, the central member being axially offset with respect to the pole faces;
wherein:
  the rotor poles extend from one side of the central member parallel to the axis of the journal; and
  the rotor means defines a flux path extending along one of the spaced rotor poles in a first direction, then extending in a direction substantially perpendicular to the first direction along the central member, then extending along another of the spaced rotor poles.

* * * * *